US010618571B2

(12) United States Patent
Whitesell, Jr. et al.

(10) Patent No.: US 10,618,571 B2
(45) Date of Patent: Apr. 14, 2020

(54) MANUFACTURE AND USE OF NONWOVEN PRODUCTS UTILIZING RIBBON CROSS-SECTION FIBERS FOR AUTOMOTIVE APPLICATIONS

(71) Applicant: International Automotive Components Group North America, Inc., Southfield, MI (US)

(72) Inventors: Kenneth Mitchell Whitesell, Jr., Troy, NC (US); Sean Bracken Simmons, Concord, NC (US); Ernest Franklin Wilson, Albemarle, NC (US)

(73) Assignee: Auria Solutions UK I Ltd., London (GB)

( * ) Notice: Subject to any disclaimer, the term of this patent is extended or adjusted under 35 U.S.C. 154(b) by 122 days.

(21) Appl. No.: 15/614,868

(22) Filed: Jun. 6, 2017

(65) Prior Publication Data
US 2017/0349222 A1    Dec. 7, 2017

Related U.S. Application Data

(60) Provisional application No. 62/346,893, filed on Jun. 7, 2016.

(51) Int. Cl.
| | | |
|---|---|---|
| *B62D 29/00* | (2006.01) | |
| *D04H 1/485* | (2012.01) | |
| *B29C 70/10* | (2006.01) | |
| *B29C 51/02* | (2006.01) | |

(Continued)

(52) U.S. Cl.
CPC .......... *B62D 29/001* (2013.01); *B29C 43/003* (2013.01); *B29C 43/02* (2013.01); *B29C 51/02* (2013.01); *B29C 70/04* (2013.01); *B29C 70/10* (2013.01); *B29D 99/0057* (2013.01); *B62D 25/2072* (2013.01); *D04H 1/435* (2013.01); *D04H 1/4391* (2013.01); *D04H 1/46* (2013.01);

(Continued)

(58) Field of Classification Search
CPC ......... D04H 1/435; D04H 1/488; D04H 1/593
See application file for complete search history.

(56) References Cited

U.S. PATENT DOCUMENTS

| | | | |
|---|---|---|---|
| 4,156,071 A | 5/1979 | Knox | |
| 5,158,844 A | 10/1992 | Hagens et al. | |

(Continued)

FOREIGN PATENT DOCUMENTS

| | | |
|---|---|---|
| EP | 1 091 028 A1 | 4/2001 |
| EP | 2179081 B1 | 11/2011 |

(Continued)

OTHER PUBLICATIONS

Computerized English translation to JP 51/1769 A obtained from Japanese Patent Office website (Year: 1976).*

(Continued)

*Primary Examiner* — Jeremy R Pierce
(74) *Attorney, Agent, or Firm* — Steven J. Grossman; Grossman, Tucker, Perreault & Pfleger, PLLC

(57) ABSTRACT

A molded automotive textile nonwoven and its associated method of manufacturing includes flat staple fibers exhibiting a width to thickness ratio of 2 to 10 and a denier in the range of 2 to 30. The molded automotive textile non-woven is a three-dimensional (3D) structure that includes one or a plurality of protrusions or recesses which fits to the metallic vehicle floor pan of the vehicle.

13 Claims, 2 Drawing Sheets

(51) Int. Cl.
| | |
|---|---|
| *D04H 1/4391* | (2012.01) |
| *D04H 1/46* | (2012.01) |
| *B29D 99/00* | (2010.01) |
| *D04H 1/558* | (2012.01) |
| *B29C 70/04* | (2006.01) |
| *B29C 43/00* | (2006.01) |
| *B29C 43/02* | (2006.01) |
| *B62D 25/20* | (2006.01) |
| *D04H 1/435* | (2012.01) |
| *D04H 1/488* | (2012.01) |
| *D04H 1/593* | (2012.01) |
| *B29K 23/00* | (2006.01) |
| *B29K 67/00* | (2006.01) |
| *B29K 105/00* | (2006.01) |
| *B29L 31/30* | (2006.01) |

(52) U.S. Cl.
CPC ............ *D04H 1/485* (2013.01); *D04H 1/488* (2013.01); *D04H 1/558* (2013.01); *D04H 1/593* (2013.01); *B29K 2023/12* (2013.01); *B29K 2067/00* (2013.01); *B29K 2105/25* (2013.01); *B29L 2031/30* (2013.01)

(56) References Cited

U.S. PATENT DOCUMENTS

| | | |
|---|---|---|
| 5,415,071 A | 5/1995 | Davies |
| 6,092,622 A * | 7/2000 | Hiers .................... D04H 1/485 442/388 |
| 7,060,344 B2 | 6/2006 | Pourdeyhimi et al. |
| 7,153,793 B2 | 12/2006 | Willis et al. |
| 2012/0175074 A1 | 7/2012 | Gupta et al. |
| 2012/0177996 A1 | 7/2012 | Gupta et al. |
| 2012/0178331 A1 | 7/2012 | Gupta et al. |
| 2012/0180968 A1 | 7/2012 | Gupta et al. |

FOREIGN PATENT DOCUMENTS

| | | | |
|---|---|---|---|
| EP | 3023136 A1 | 5/2016 | |
| JP | 51-1769 A * | 1/1976 | ............... D04H 1/54 |
| WO | 2003/053667 A2 | 7/2003 | |
| WO | 2012/054663 A1 | 4/2012 | |
| WO | 2012054671 A1 | 4/2012 | |
| WO | 2012054675 A2 | 4/2012 | |
| WO | 2016022880 A1 | 2/2016 | |

OTHER PUBLICATIONS

W.C.Smith, et al; "Nonwovens in Automotives—More Than Just a Pretty Face"; International Nonwovens Journal Fall 2004 (pp. 60-65).

Extended European search report, dated Oct. 19, 2017, issued in corresponding European Patent Application No. 17174690.2.

* cited by examiner

MANUFACTURE AND USE OF NONWOVEN PRODUCTS UTILIZING RIBBON CROSS-SECTION FIBERS FOR AUTOMOTIVE APPLICATIONS

FIELD

This application claims the benefit of U.S. Provisional Patent Application Ser. No. 62/346,893, filed on Jun. 7, 2016, which is fully incorporated herein by reference.

FIELD

The present disclosure is directed to the manufacture and use of nonwoven products utilizing ribbon cross-section fibers for automotive applications.

BACKGROUND

Many automotive components are manufactured using both woven and nonwoven fabrics. Such components include molded floor systems, floor mats, trunk mats, seat backs, package trays and cargo compartments. Nonwoven fabrics demonstrate the potential to assist in decreasing vehicle weight while improving comfort and aesthetics, abrasion resistance, chemical resistance, thermal insulation, and sound insulation characteristics. However, conventional needle punched fabrics, in particular, tend to matt or distort during the molding processes. In addition, development continues with the goal to drive the weight and cost of the fabric down while maintaining, if not improving upon, properties exhibited by heavier woven and nonwoven textiles currently in use.

SUMMARY

An aspect of the present disclosure relates to a molded automotive textile nonwoven, which includes flat staple fibers exhibiting a width to thickness ratio of 2 to 10 and a denier in the range of 2 to 30. The nonwoven preferably exhibits a 30% greater abrasion resistance than a molded nonwoven comprising round staple fibers of the same denier as measured by the taber abrasion method using a 1,000 gm weight and the H18 wheel.

In embodiments of the above, the flat staple fibers comprise a thermoplastic material selected from one or more of the following: polyester or polypropylene. In addition, in any of the above embodiments binder fibers are present in the range of 0.1 to 50 percent by weight of the total weight of the flat staple fibers and the binder fibers.

In addition, in any of the above embodiments, the molded automotive textile nonwoven further comprises one or more of the following layers: latex, polymer, and binder fiber. Further, in any of the above embodiments the molded automotive textile nonwoven further comprises one or more additional layers of woven fabric, nonwoven fabric, polymer film, and metallic film.

In another aspect, the present disclosure relates to a method of manufacturing a molded automotive textile nonwoven. The method includes providing flat staple fibers exhibiting a width to thickness ratio in the range of 2 to 10 and a denier in the range of 2 to 30, mechanically bonding the flat staple fibers to form a nonwoven, and molding the non-woven into a three-dimensional (3D) shape that fits the contour of a metallic vehicle floor pan. In embodiments, the flat staple fibers are preferably mechanically bonded by needle-punching. In addition, in embodiments of the above, the flat staple fibers are formed from one or more of the following thermoplastics materials: polyester or polypropylene.

The method further comprises, in any of the above embodiments, providing a binder fiber with the flat staple fibers, wherein the binder fibers are present in the range of 0.1 to 50.0 percent by weight of the total weight of the flat staple fibers and the binder fibers. In any of the above embodiments, the method may also comprise thermally bonding the nonwoven prior to molding into the three-dimensional shape that fits to the contour of metallic vehicle floor pan contour.

In further embodiments of the above, the method further comprises providing one or more of the following layers prior to molding of the nonwoven: latex, polymer layer, and binder fiber. In addition, in any of the above embodiments, the non-woven may include one or more additional layers of woven fabric, nonwoven fabric, polymer film, and metallic film.

In yet a further aspect, the present disclosure is directed to a non-woven automotive component, comprising an automotive textile nonwoven as set forth above, wherein said automotive component is selected from one of the following: a molded floor system, a floor mat, a trunk mat, a seat back, a package tray, and a cargo compartment.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure is directed to the manufacture and use of nonwoven products utilizing ribbon cross-section fibers for automotive applications. Such applications include molded floor systems, floor mats, trunk mats, seat backs, package trays and cargo compartments.

The nonwoven products exhibit relatively lower areal weight yet maintain and exceed the mechanical, tactile and visual properties exhibited by heavier weight products.

In particular, the molded floor system herein is understood as reference to a three-dimensionally molded product (e.g. via compression molding) that tracks and fits within the shape or contour of the vehicle floor pan. The vehicle floor pan is generally understood as a sheet metal stamping that forms the floor of the vehicle and serves as the foundation of most of the structural and mechanical components to which the powertrain, suspension system, and other parts may be attached. It is therefore itself a three-dimensional structure that includes a plurality of regions that protrude from the floor as well as a plurality of locations that define a recess into the flooring.

Figure 1A:
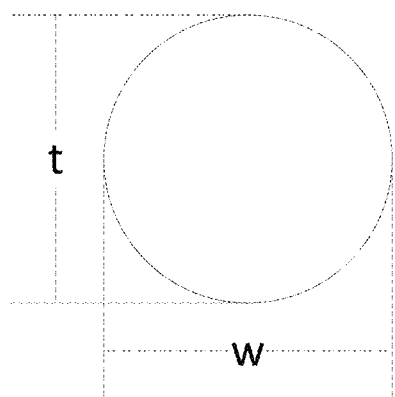
FIG. 1a is a schematic of a cross-sectional view of an embodiment of a traditional staple fiber exhibiting a rounded configuration.
Figures 2A, 2B:
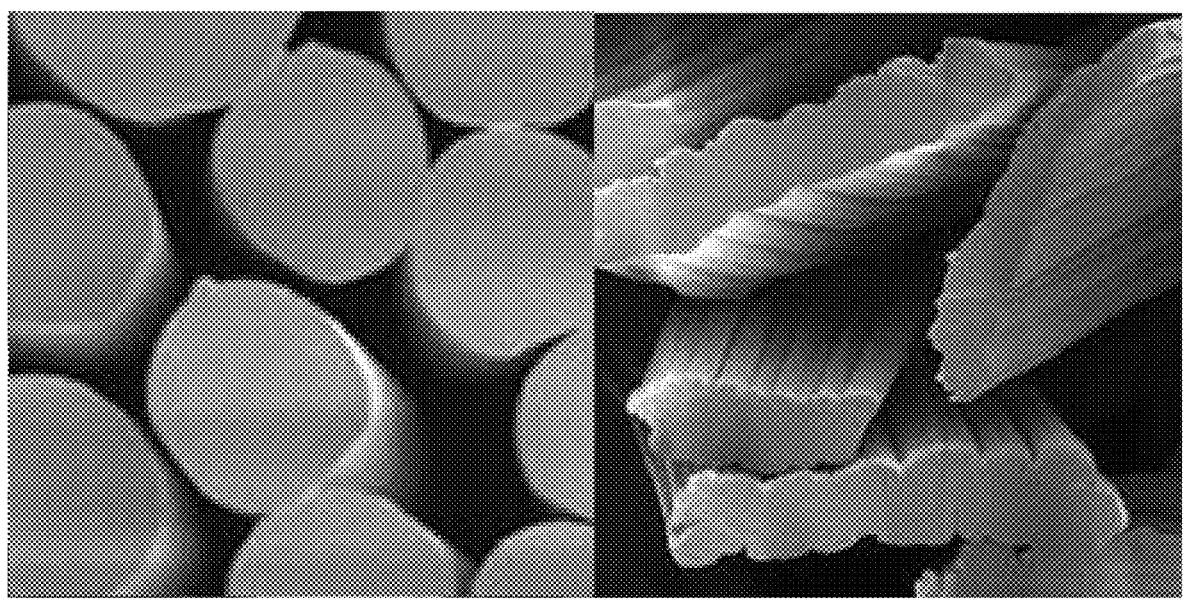
FIG. 2a is an image of a cross-sectional view of an example of a traditional, round staple fiber taken at 2000× magnification.
FIG. 2b is an image of a cross-sectional view of an example of a ribbon shaped, flat staple fiber taken at 2000× magnification.

The nonwovens of the present disclosure utilize relatively flat staple fibers, which exhibit ribbon cross-sections, in their construction. Staple fibers traditionally exhibit a round, or circular cross-section as illustrated in FIG. 1a, wherein the width to thickness ratio (width/thickness) is less than 2, such as in the range of 0.1 to 1.9 and preferably 1.0. In addition, such traditional, round staple fibers may exhibit a denier in the range of 2 to 30. FIG. 2a is an image of the cross-sections of the round staple fibers. Fibers in this configuration are believed to be used in 98% of the nonwovens used in automotive applications.

Figure 1B:
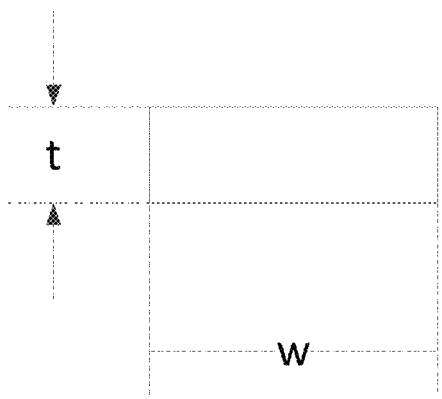
FIG. 1b is a schematic of cross-sectional view of an embodiment of a flat staple fiber exhibiting a generally rectangular configuration.

Flat staple fibers, on the other hand, may be understood as fibers that exhibit a cross-section exhibiting a width to thickness ratio (width/thickness) of 2 or greater, such as in the range of 2.0 to 10.0, including all values and ranges therein, and preferably in the range of 3 to 5, as illustrated in FIG. 1b. The flat staple fibers herein also preferably exhibit a denier in the range of 2 to 30, including all values and ranges therein, and preferably in the range of 4 to 8. Further, the staple fibers may exhibit a length of greater than 0.5 mm, such as in the range of 0.5 mm to 150 mm, including all values and ranges therein. It should be appreciated that the width, thickness and length are measured at the longest linear dimension. In embodiments, the flat staple fibers are formed from a thermoplastic and, preferably, the thermoplastic includes from one or more of the following: polyester or polypropylene. As seen in the image of FIG. 2b, the flat staple fibers may exhibit a rectangular, ribbon configuration. It is noted that FIG. 2b illustrates that the surface of the staple fiber need not be planar, but may exhibit some degree of surface variation or roughness.

The staple fibers may be formed into nonwovens by mechanical bonding techniques, chemical bonding techniques, thermal bonding techniques or combinations thereof. Preferably, the staple fibers are mechanically formed through needle-punched. However, hydroentanglement or stitch-bonding processes are also envisioned. After being mechanically formed, the fibers may then be chemically bonded, thermally bonded, or both. Chemical bonding is accomplished, in embodiments, through the use of adhesives applied in a continuous, or discontinuous manner using powders, spray, or liquid bonding agents. Thermal bonding is accomplished through the use of ultrasonic bonding, thermal point bonding, or calendaring.

As alluded to above, the non-woven may also be subject to molding, such as compression molding, where the non-woven is shaped into a three-dimensional configuration that will generally track and fit the contour (protrusions and/or recesses) of the metallic vehicle floor pan. In such manner, it is understood that the non-woven herein will therefore be one that is molded into a shape such that it will have protrusions and or recesses or other three-dimensional (3D) relief patterns that will generally match and align with the contour of the metallic vehicle floor pan, so that it can lay on top of and nest to the metallic vehicle floor pan and engage and fit to such metallic contour. Accordingly, the plurality of protrusions and recesses present on the molded non-woven herein will align and fit to the plurality of protrusions and recesses of the metallic vehicle floor pan. Optionally, the molded non-woven may include some acoustic backing or other material positioned between itself and the floor pan, which is also molded with the non-woven in similar manner.

In particular embodiments, binder fibers are incorporated into the nonwoven. The binder fibers are selected from single component fibers, bi-component fibers that include two polymer components, or multi-component fibers that include more than two polymer components. Binder fibers, when present, may be present in the range of 0.1 to 50% by weight of the total weight of the flat staple fibers and the binder fibers. The binder fiber may be understood as a fiber that begins to melt and deform at a temperature that is less than melt temperature of the flat staple fibers. Preferably, the binder fiber exhibits a melt temperature that is at least 10° C. below that of the flat staple fiber, such as in the range of 10° C. to 30° C. below that of the flat staple fiber, including all values and ranges therein. Further, the binder fibers maybe formed from a thermoplastic polymer, such as acrylic, acetate, polyvinyl chloride, polyvinyl alcohol, polyethylene or polypropylene. In addition, the use of the binder fiber may assist in improving mechanical properties. Alternatively, or in addition to the use of the binder fiber, the nonwoven may include one or more layers of latex or a polymer film to join and lock the fibers together.

In comparing needle-punched nonwovens using traditional round fibers and flat fibers of the same denier, it was found that the flat fibers exhibited a number of improvements. For example, the molded nonwovens formed utilizing flat fibers exhibited less matting and distortion than those utilizing traditional circular fibers at the same denier. Traditional, round cross-section nonwovens may exhibit a pile distortion in deep draw areas when the nonwoven is molded. The flat cross-section fibers minimize the degree of pile distortion in the same deep draw areas. In addition, the circular fibers exhibit a relatively coarser hand, whereas the flat fibers exhibit a relatively softer, more refined hand at the same denier. It was also found that the nonwovens including the flat staple fibers exhibited an increase of up to 30% in abrasion resistance. This improvement allows a weight reduction of up to 20% with equal abrasion resistance performance to a traditional round cross-section. The abrasion resistance being measured by Taber abrasion testing using a 1000 gm weight and an H18 wheel on both the round and flat cross-section nonwovens. For the same given weight, the number of cycles to failure was up to 30% higher on the flat staple fiber materials.

As alluded to above, the molded nonwovens herein may be combined with one or more layers of material. For example, additional nonwoven or woven fabric layers maybe included as well as layers of polymer or metallic films. Furthermore, latex or other adhesive layers may be incorporated into the product. The various layers may be stitched or adhered together and the non-woven with such additional layers may then be molded into a three-dimensional shape that fits to the metallic vehicle floor pan. Accordingly, the nonwovens may be formed through processes such as compression molding and/or thermoforming. Bindings may also be affixed to the edges of the nonwovens to join multiple layers together or prevent fraying at the edges.

What is claimed is:

1. A molded automotive textile nonwoven, comprising:
   flat staple fibers exhibiting a width to thickness ratio of 2 to 10 and a denier in the range of 2 to 30 wherein said non-woven is of a molded shape that is configured to fit to a metallic vehicle floor pan having a three-dimensional contoured shape with protrusions or recesses wherein said molded shape aligns with said vehicle floor pan three-dimensional contour and which molded shape lays on top of said metallic vehicle floor pan; and wherein said molded automotive textile nonwoven exhibits a greater abrasion resistance than a nonwoven comprising round staple fibers of the same denier, as measured by the Taber abrasion method using a 1,000 gm weight and the H18 wheel.

2. The molded automotive textile nonwoven of claim 1, wherein said automotive textile nonwoven exhibits up to 30% greater abrasion resistance than a nonwoven comprising round staple fibers of the same denier, as measured by the Taber abrasion method using a 1,000 gm weight and the H18 wheel.

3. The molded automotive textile nonwoven of claim 1, wherein the flat staple fibers comprise a thermoplastic material selected from one or more of the following: polyester or polypropylene.

4. The molded automotive textile nonwoven of claim 1, further comprising binder fibers present in the range of 0.1 to 50 percent by weight of the total weight of the flat staple fibers and the binder fibers.

5. The molded automotive textile nonwoven of claim 1, further comprising one or more of the following layers: latex, polymer, and binder fiber.

6. The molded automotive textile nonwoven of claim 3, further comprising one or more additional layers of woven fabric, nonwoven fabric, polymer film, and metallic film.

7. A method of manufacturing a molded automotive textile nonwoven comprising:
providing flat staple fibers exhibiting a width to thickness ratio of 2 to 10 and a denier in the range of 2 to 30;
mechanically bonding said flat staple fibers to form a nonwoven;
molding said nonwoven into a three-dimensional molded product that is configured to fit to a metallic vehicle floor pan having a three-dimensional contoured shape with protrusions or recesses wherein said molded shape aligns with said vehicle floor pan three-dimensional contour and which molded shape lays on top of said metallic vehicle floor pan; and
wherein said molded automotive textile nonwoven exhibits a greater abrasion resistance than a nonwoven comprising round staple fibers of the same denier, as measured by the Taber abrasion method using a 1,000 gm weight and the H18 wheel.

8. The method of claim 7, wherein the flat staple fibers are mechanically bonded by needle-punching.

9. The method of claim 7, wherein the flat staple fibers are formed from one or more of the following thermoplastics materials: polyester or polypropylene.

10. The method of claim 7, further comprising providing a binder fiber with the flat staple fibers, wherein the binder fibers are present in the range of 0.1 to 50.0 percent by weight of the total weight of the flat staple fibers and the binder fibers.

11. The method of claim 7, further comprising providing one or more of the following layers to the non-woven: latex, polymer layer, and binder fiber.

12. The method of claim 7, providing one or more additional layers to the non-woven comprising woven fabric, nonwoven fabric, polymer film, and metallic film.

13. The method of claim 7 wherein said three-dimensional non-woven molded product includes a plurality of protrusions and recesses and said metallic vehicle floor pan includes a plurality of protrusions and recesses and said protrusions and recesses of said non-woven are aligned with said plurality of protrusions and recesses of said metallic vehicle floor pan.

* * * * *